(12) United States Patent
Admon (10) Patent No.: US 7,606,848 B2
(45) Date of Patent: Oct. 20, 2009

(54) DETECTOR IN PARALLEL WITH A LOGIC COMPONENT

(75) Inventor: Itay Admon, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 887 days.

(21) Appl. No.: 11/199,322

(22) Filed: Aug. 8, 2005

(65) Prior Publication Data

US 2007/0168788 A1    Jul. 19, 2007

(51) Int. Cl.
    *G06F 15/00*  (2006.01)

(52) U.S. Cl. ........................ 708/209; 708/525
(58) Field of Classification Search ................ 708/209, 708/210, 211, 525
    See application file for complete search history.

(56) References Cited

U.S. PATENT DOCUMENTS

| | | | | |
|---|---|---|---|---|
| 5,469,377 A | * | 11/1995 | Amano | 708/497 |
| 5,497,340 A | * | 3/1996 | Uramoto et al. | 708/552 |
| 6,009,451 A | * | 12/1999 | Burns | 708/525 |
| 6,829,321 B1 | * | 12/2004 | Ikeno | 377/64 |

* cited by examiner

*Primary Examiner*—Chuong D Ngo
(74) *Attorney, Agent, or Firm*—Lee & Hayes, PLLC (57) ABSTRACT

One or more detectors are provided for processing input in parallel with a logic component receiving the same input. Apparatus described herein include one or more logic components that are configured to perform logical operations on an input vector, and one or more detectors that are configured to receive a portion of the input vector. The detector is further configured to perform detections on this portion of the input vector in parallel with the logical operation. Methods described herein include identifying a portion of the input vector, wherein the portion of the input vector appears an output of the logic component, and analyzing the portion of the vector in parallel with a logical operation performed by the logic component.

15 Claims, 9 Drawing Sheets

DETECTOR IN PARALLEL WITH A LOGIC COMPONENT

BACKGROUND

Arithmetic operations are supported by a variety of central processing units (CPUs), floating point engines (FPEs), and other similar hardware. In some operations, such as floating point addition, it may be appropriate to determine when some portions of an operand assume given bit patterns. For example, it may be useful to determine if a floating point mantissa contains all logical ones, if certain "sticky bits" in an operand are all zeroes, or if operands contain certain predefined patterns of logical values. This processing can be useful, for example, in rounding operations performed in connection with floating point calculations.

To determine when these operands contain the above or other bit patterns, a detector stage can operate on a given input vector. However, some arithmetic operations, such as floating point addition, can involve a plurality of shift operations being performed sequentially on the input vector by successive stages of a multi-stage shifter, with the detector stage following the last one of the shift operations. This scenario results in the entire process being serial in nature, with the output of the detector stage being delayed until after all of the shift operations have been completed by the multi-stage shifter.

BRIEF DESCRIPTION OF THE DRAWINGS

The subject matter presented herein may be better understood, and its numerous features and advantages made apparent to those skilled in the art by referencing the accompanying drawings. In the figures, the left-most digit(s) of a reference number identifies the figure in which the reference number first appears. The use of the same reference numbers in different figures indicates similar or identical items.

DESCRIPTION OF THE EMBODIMENT(S)

Figure 1:
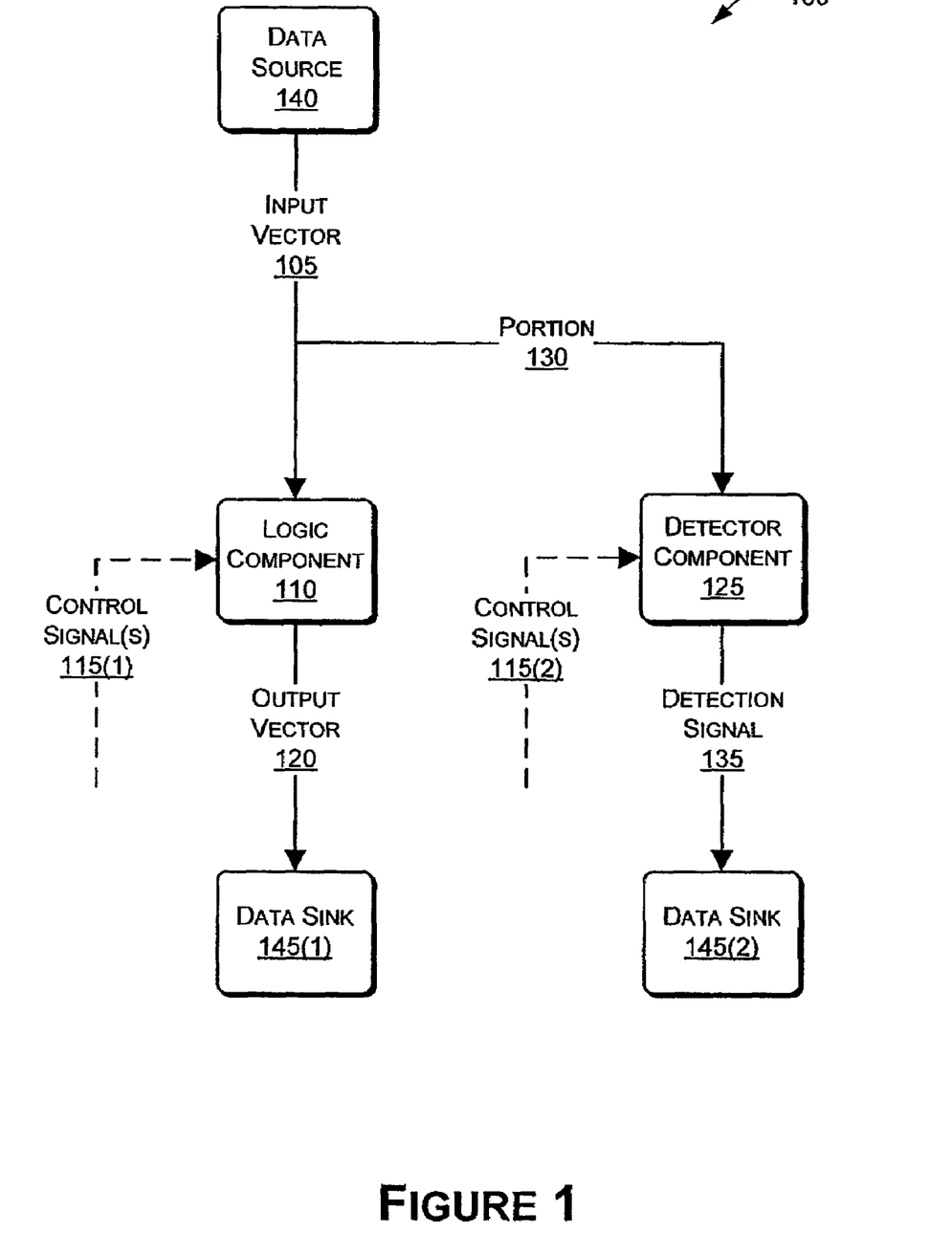
FIG. 1 is a block diagram of an overall architecture in which a detector component and related processes may be deployed.

FIG. 1 illustrates an overall circuit architecture 100 in which the teachings herein may be deployed. An input vector 105 is provided to a logic component 110, which may, for example, take the form of a shift component, a multiplexer, or any other suitable hardware and/or software component or components. Some, but not necessarily all, instances of the logic component 110 may be governed by one or more control signals 115(1), such that the logic component 110 produces an output vector 120 in response to the control signals 115(1). However, the control signals 115(1) may not be included in all implementations of the logic component 110, and this optional status is indicated by the dashed line 115(1) shown in FIG. 1. In instances where the control signals 115(1) are not included, the logic component 110 may perform the same operation the same way on at least one given input vector 105.

In parallel with the logic component 110, a detector component 125 receives at least a portion 130 of the input vector 105, and operates thereon in parallel with whatever operation is performed by the logic component 110. As used herein to describe at least two operations, the term "parallel" refers to there being at least some overlap between the occurrence between the two operations, rather than the output of one operation being the input to another operation, or the completion of one operation being a prerequisite for the other operation. More particularly, the detector component 125 may be configured to recognize or detect at least one particular sequence or at least one pattern of bits within the portion 130 of the input vector 105 received by the detector component 125. An output detection signal 135 indicates whether the portion 130 of the input vector 105 matches the sequence or pattern of bits that the detector component 125 is configured to recognize.

As with the logic component 110, the detector component 125 can also be responsive to one or more control signals 115(2). Control signals 115(1) and 115(2) are referred to collectively herein as control signals 115. In some instances, the detector component 125 and the logic component 110 can be responsive to at least one common control signal 115. However, this need not necessarily be true in all implementations of the teachings herein. Accordingly, the control signals 115 are shown in dashed outline as represented in FIG. 1.

Because the detector component 125 performs its detection on the portion 130 of the input vector 105 in parallel with whatever operation is performed by the logic component 110, the output vector 120 and the detection signal 135 may be made available concurrently. In contrast, if the detector component 125 and the logic component 110 were arranged in serial relation, such that the detector component 125 processed the output 120 of the logic component 110, then the output 135 of the detector component 125 would await the completion of the processing performed by the logic component 110, increasing the overall wait time consumed by the two serial operations.

The circuit architecture 100 may be deployed in a system with one or more data sources 140 that provide input to the circuit architecture 100, and with one or more data sinks 145(1) and 145(2) that consume output from the circuit architecture 100. The data source 140, may represent, for example, one or more components that provide the input vector 105 to the circuit architecture 100. The output vector 120 may be routed to the data sink 145(1), and the detection signal may be routed to the data sink 145(2). It is understood that the data sinks 145(1) and 145(2) can be the same component or can be different components.

It is further understood that the other aspects of the circuits and/or architectures as shown in FIGS. 2-9 can also be deployed in a system with the data sources 140 and the data sinks 145(1) and 145(2). However, in the interest of clarity, the data sources 140 and the data sinks 145(1) and 145(2) are shown only in FIG. 1.

Figure 2:
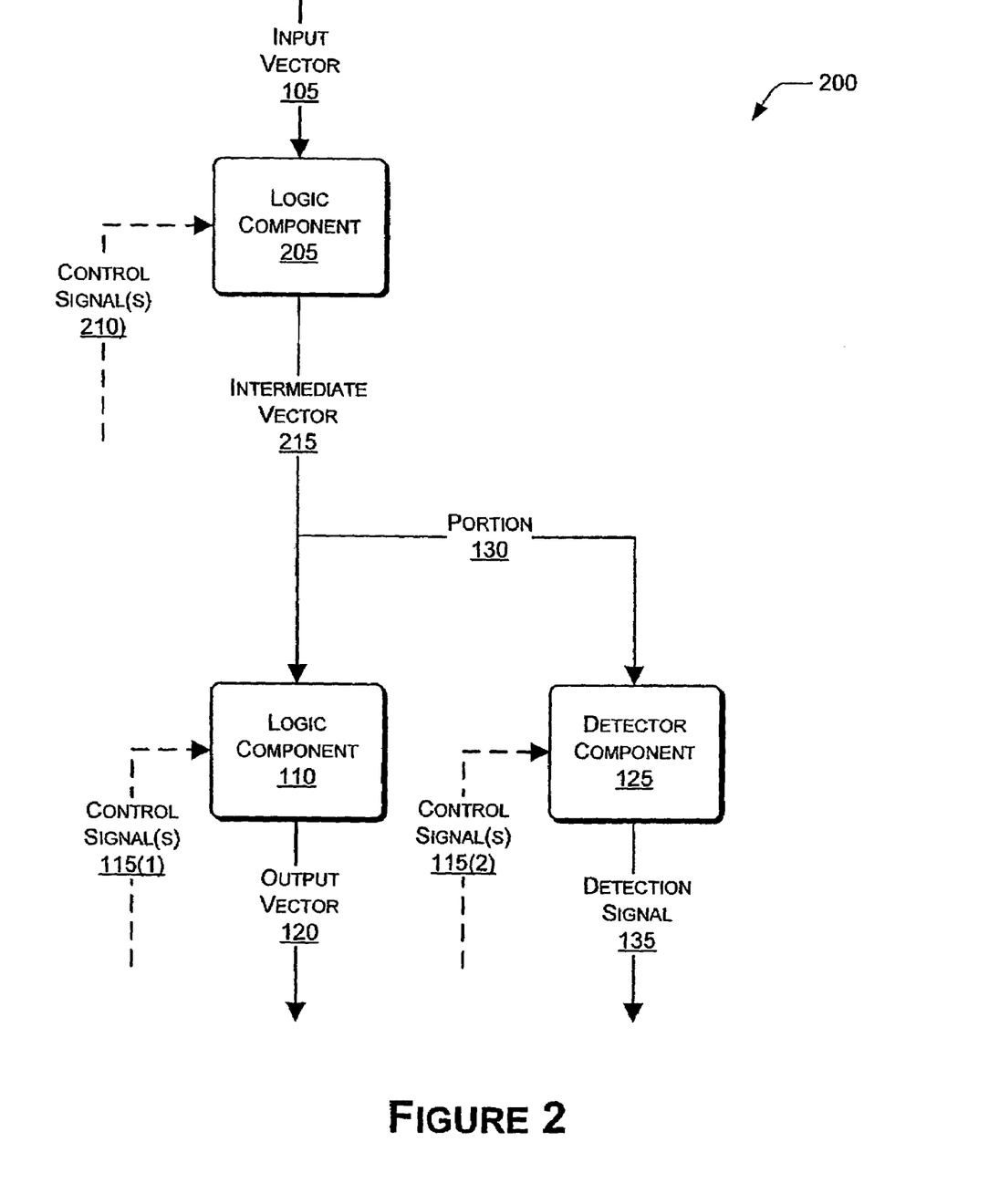
FIG. 2 is a block diagram of a further architecture that builds upon the overall architecture as shown in FIG. 1.

FIG. 2 illustrates a further circuit architecture 200 that builds upon the architecture 100 shown in FIG. 1. More particularly, FIG. 2 illustrates another logic component 205 that receives the input vector 105 and one or more control signals 210, and produces as output an intermediate vector 215. This intermediate vector 215 is provided as input to the logic component 110, which was discussed above in connection with FIG. 1. Also, at least a portion 130 of the intermediate vector 215 may be provided to the detector component 125 as input, also discussed in FIG. 1 above. All other elements of FIG. 2 are identical or similar to corresponding elements shown in FIG. 1.

Figure 3:
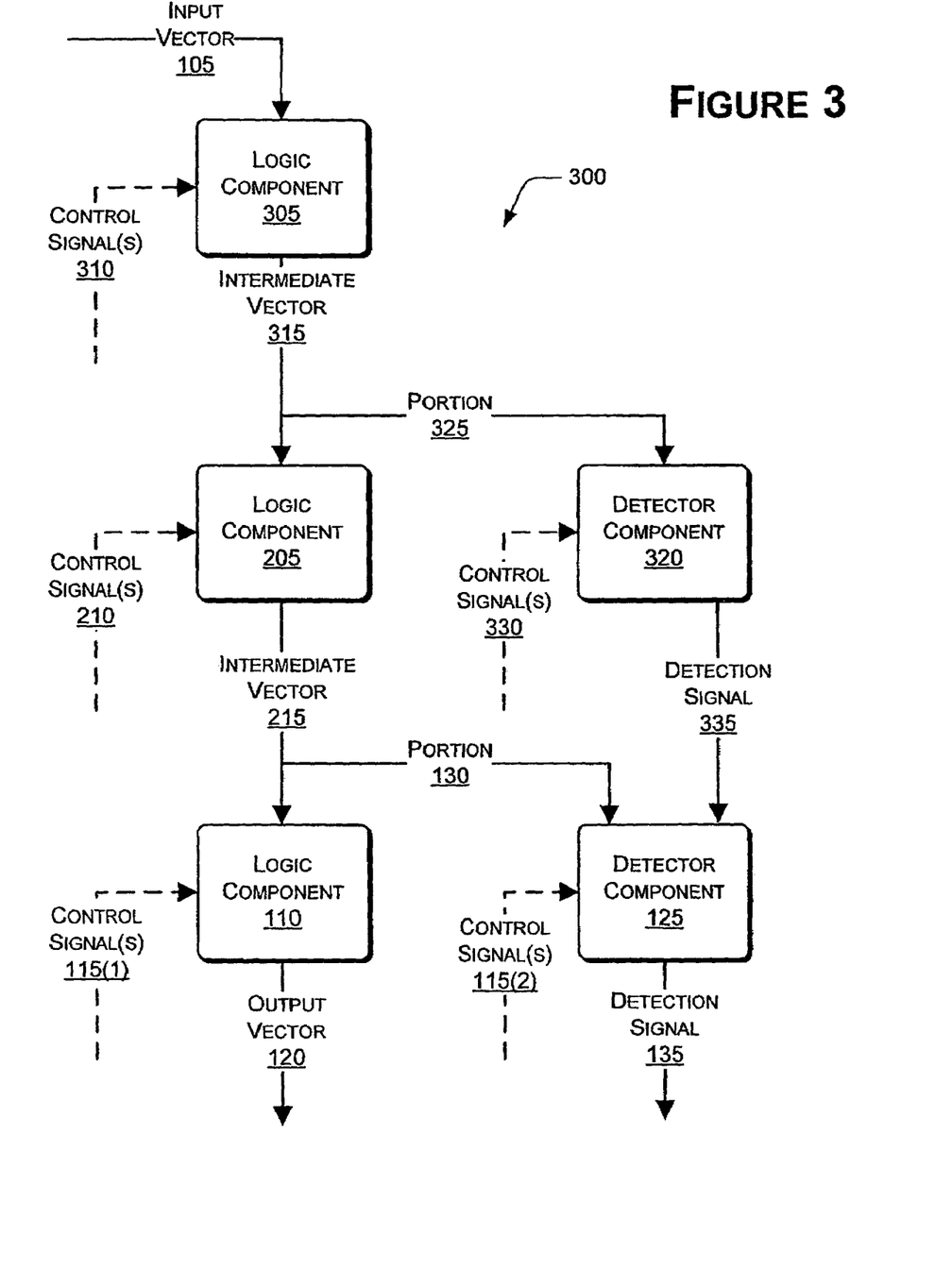
FIG. 3 is a block diagram of a further architecture that builds further upon the architecture as shown in FIG. 2.

FIG. 3 illustrates a further circuit architecture 300 that builds upon the architecture 200 shown in FIG. 2. In FIG. 3, a further logic component 305 receives the input vector 105 and one or more control signals 310, and produces as output a further intermediate vector 315. This intermediate vector 315 is provided as input to the logic component 205, which was discussed above in connection with FIG. 2.

FIG. 3 also illustrates a further detector component 320, which receives at least a portion 325 of the intermediate vector 315 as input. The detector component 320 can be responsive to one or more control signals 330. Similarly to the detector component 125 discussed in connection with FIGS. 1 and 2, the detector component 320 can recognize or detect particular patterns of bits in the portion 325 of the intermediate vector 315 received as input. Note that the detector component 320 can process at least the portion 325 of the intermediate vector in parallel with the operations performed by the logic component 205, while the detector component 125 can process the portion 130 of the intermediate vector 215 in parallel with the operations performed by the logic component 110. The detector component 320 can produce as output one or more detection signals 335, which may be transmitted to the detector component 125 for further processing. All other elements of FIG. 3 are identical or similar to corresponding elements shown in FIGS. 1 and/or 2.

Figure 4:
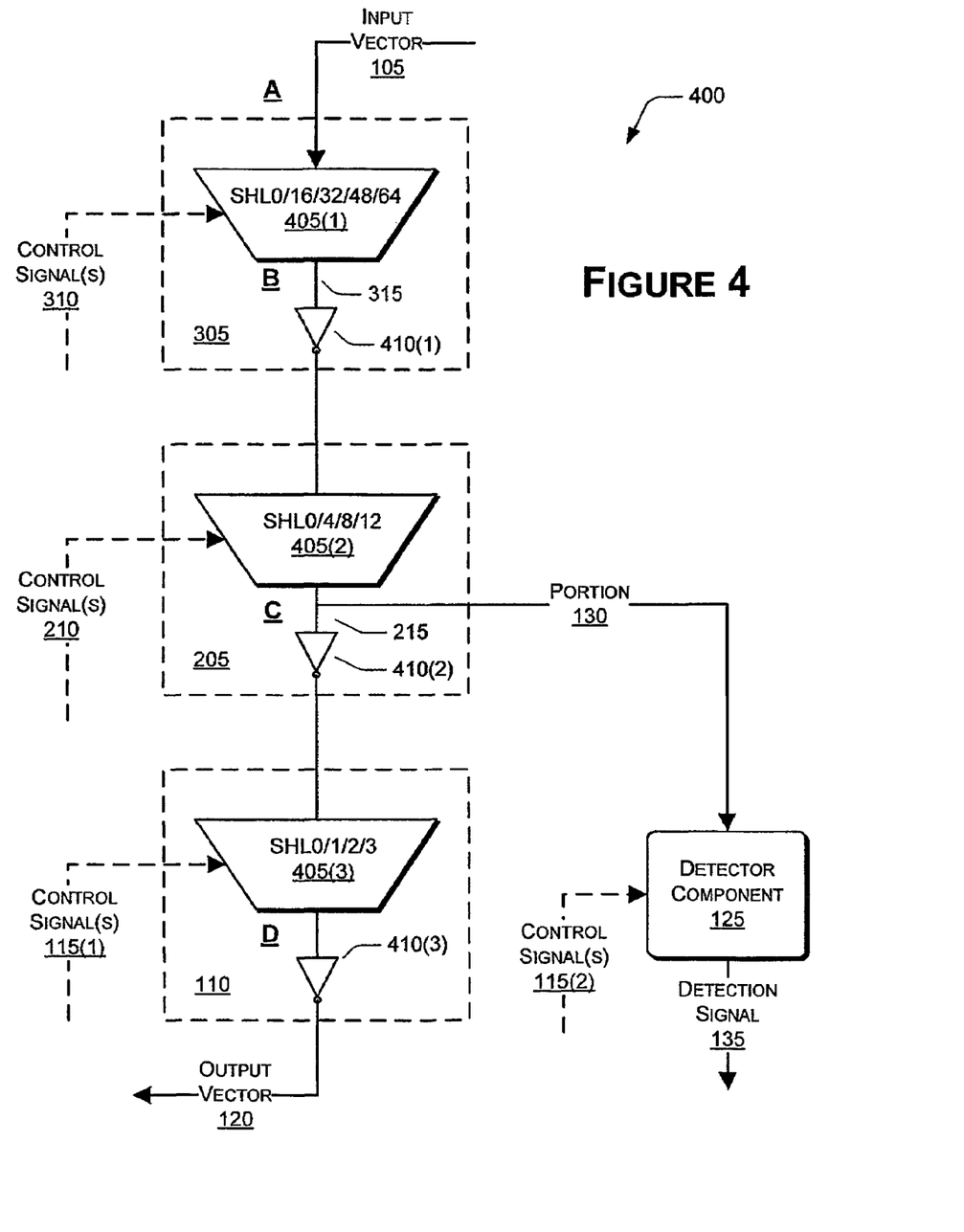
FIG. 4 is a circuit diagram that illustrates further details of the logic components as shown in FIGS. 1-3.

FIG. 4 illustrates a circuit 400 that includes further details of the logic components 110, 205, and 305 shown in FIGS. 1-3. More particularly, the logic component 305 is shown in FIG. 4 to include a shift component 405(1), which may take the form of a multiplexer or other suitable shift register logic. It is noted that this shift component 405(1) is illustrated and discussed herein only as an example that aids the instant description, but not to limit the teachings herein. The intermediate vector 315 is output from the shift component 405(1), and can be passed through an inverter stage 410(1) as appropriate. The control signals 310 passed to the logic component 305 can take the form of shift control signals that control various modes of operation supported by the shift component 405(1).

Similarly, the logic component 205 is shown to include a shift component 405(2), which may also take the form of a multiplexer or other suitable shift register logic. The logic component 205 also includes an inverter stage 410(2). At least a portion 130 of the intermediate vector 215 output from the shift component 405(2) is routed to the detector component 125 for processing. Finally, the logic component 110 is shown to include a shift component 405(3), which may also take the form of a multiplexer or other suitable shift register logic. The logic component 110 can also include an inverter stage 410(3). For convenience, the shift components 405(1)-(3) are referred to collectively as shift components 405, and inverter stages 410(1)-(3) are referred to collectively as inverter stages 410.

The shift components 405 shown in FIG. 4 can implement the circuit 400 in the form of a multi-stage shifter that performs, for example, a shift left (SHL) operation. It is noted that shift operations in general, and the shift left operation in particular, are discussed herein only to provide an example implementation of the teachings herein, and not to suggest an exclusive or limited implementation of such teachings.

The multi-stage shifter receives the input vector 105, which may be, for example, n-bits wide and represented by the notation [n:0]. The shift component 405(1) is responsive to the first shift control signal 310 to shift the input vector 105 left by, for example, 0, 16, 32, 48, or 64 bits, producing the intermediate vector 315 as output. The output of the shift component 405(1) passes through the inverter stage 410(1) and is input to the shift component 405(2).

The shift component 405(2) is responsive to the shift control signal 210 to shift its input vector left by, for example, 0, 4, 8, or 12 bits, producing the intermediate vector 215 as output. The output of the shift component 405(2) passes through the inverter stage 410(2) and is input to the shift component 405(3).

The shift component 405(3) is responsive to the shift control signal 115(1) to shift its input vector left by, for example, 0, 1, 2, or 3 bits, producing a shifted vector as output. The output of the shift component 405(3) passes through the inverter stage 410(3), and is output from the circuit 400 as output vector 120 for use by components external to the circuit 400.

In parallel with at least the shift component 405(3), the detector component 125 receives at least a portion 130 of the intermediate vector 215 as output from the shift component 405(2), and produces the detection signal 135, which indicates whether the portion 130 matches one or more predefined patterns or sequences. It is noted that only detector component 125 is shown in FIG. 4 for clarity and convenience. As discussed in further detail below, other detector components 320 may be included that operate in parallel with, for example, shift component 405(2) and/or shift component 405(3).

For convenience of discussion, the input vector 105 is referenced by the variable A, and the outputs of the first, second, and third shift components 405, respectively, are referenced for convenience by the variables B, C, and D. The circuit 400 illustrated in FIG. 4 may thus be described by the following expressions.

Expression 1 specifies the output B of the shift component 405(1) in terms of the input vector A as follows:

$$\begin{aligned}
B := &\text{COND} \\
&[\text{ shl0 }] \ A[n:0]\ ; \\
&[\text{ shl16 }] \ A[(n\text{-}16):0]\ \&\ \text{`0::16}\ ; \\
&[\text{ shl32 }] \ A[(n\text{-}32):0]\ \&\ \text{`0::32}\ ; \\
&[\text{ shl48 }] \ A[(n\text{-}48):0]\ \&\ \text{`0::48}\ ; \\
&[\text{ shl64 }] \ A[(n\text{-}64):0]\ \&\ \text{`0::64}\ ; \\
&\text{END}
\end{aligned}$$

Expression 1

Expression 2 specifies the output C of the shift component 405(2) in terms of its input vector B as follows:

$$\begin{aligned}
C := &\text{COND} \\
&[\text{ shl0 }]\ B[n:0]\ ; \\
&[\text{ shl4 }]\ B[(n\text{-}4)\ :0]\ \&\ \text{`0::4}\ ; \\
&[\text{ shl8 }]\ B[(n\text{-}8)\ :0]\ \&\ \text{`0::8}\ ; \\
&[\text{ shl12 }]\ B[(n\text{-}12)\ :0]\ \&\ \text{`0::12}; \\
&\text{END}
\end{aligned}$$

Expression 2

Expression 3 specifies the output D of the shift component 405(3) in terms of its input vector C as follows:

```
D := COND
    [ shl0 ] C[n:0] ;
    [ shl1 ] C[(n-1):0] & '0   ;
    [ shl2 ] C[(n-2):0] & '00  ;
    [ shl3 ] C[(n-3):0] & '000 ;
END
```

Expression 3

In the above expressions, the variable "n" is the vector size or width. Recall that the shift component 405 can be responsive to one or more respective control signals 115(1), 210, or 310 to select a corresponding mode of operation. In this example, a given shift component 405 can be responsive to its control signal 115(1), 210, or 310 to select a given shift mode. Accordingly, a given line in the expressions for the shift components 405 corresponds to a given state that its corresponding control signal 115(1), 210, or 310 can take. A respective line in these expressions thus indicates how the given shift component 405 formulates its output when given that particular control signals 115(1), 210, or 310. Put another way, a given shift component 405 can generate a respective output that corresponds to the line specified for that shift component 405 in the above expressions.

An embodiment of the detector component 125 is arranged so that it can analyze at least a portion of the inputs C to the shift component 405(3) in parallel with any operation performed by the shift component 405(3), rather than analyzing the output D of the shift component 405(3) after the latter has completed its operation. Turning to Expression 3 above, this expression may be re-written for convenience as the following equivalent expression, referenced herein as Expression 4:

```
D := COND
    [ shl0 ] C[(n  ):   (n-2)] & C[(n-3):0]         ;
    [ shl1 ] C[(n-1):   (n-2)] & C[(n-3):0] & '0    ;
    [ shl2 ] C[         (n-2)] & C[(n-3):0] & '00   ;
    [ shl3 ]                     C[(n-3):0] & '000  ;
END
```

Expression 4

Thus, as stated in Expression 4, the output vector D of the shift component 405(3) can take at least four possible forms, one for each state of its control signal 115(1). These outputs D may be broken into three components, with each component separated by the "&" symbol in the Expression 4. Note that all four possible forms of the output D share a portion 130 of the input vector 215, namely the bits C[(n−3):0]. Thus, the detector component 125 may receive and analyze this common portion 130 of the input vector C independently of any shift or other operation performed by the shift component 405(3). In other words, the detector component 125 can operate directly on the input vector C without waiting for the output of the shift component 405(3).

As an illustrative but non-limiting example of the foregoing, assume that the vector size "n" is 66 bits wide. Assume further that the detector component 125 is configured to detect when the bits [66:44] of the output vector D are, for example only, all logical ones. This desired detection can be expressed as a function named All_Ones_SP, which is defined by Expression 5 as follows:

All_Ones_SP:=(D[66:44]='1::23); !(the desired detection).

Expression 5

The detection specified by Expression 5 can be written as a function of the input vector C, as indicated by Expression 6 here:

```
All_Ones_SP := COND              ! (written as a function of C)
    [ shl0 ] C[66:44] = '1::23 ;
    [ shl1 ] C[65:43] = '1::23 ;
    [ shl2 ] C[64:42] = '1::23 ;
    [ shl3 ] C[63:41] = '1::23 ;
END
```

Expression 6

Expression 6 can be re-written similarly to how Expression 3 was partitioned into different components above, as shown by Expression 7 below:

```
All_Ones_SP := COND                              ! (same - repartitioned).
    [ shl0 ] ( C[66:   64] & C[63:44]              ) = '1::23 ;
    [ shl1 ] ( C[65:   64] & C[63:44] & C[43    ]  ) = '1::23 ;
    [ shl2 ] ( C[      64] & C[63:44] & C[43:42 ]  ) = '1::23 ;
    [ shl3 ] (              C[63:44] & C[43:41 ]  ) = '1::23 ;
END
```

Expression 7

Note that the 20-bit portion [63:44] of the input vector C appears in each of the four illustrated outputs of Expression 7. Thus, Expression 7 can be split into two parts: a common portion that includes the 20-bit portion C[63:44], and a non-common or remainder portion that includes the possible output bits other than the common 20-bit portion C[63:44]. Expression 8 defines two functions that compute the results of this partition, as follows:

```
PreCalc_C := (C[63:44] = '1::20) ;
Remainder_C := COND
    [ shl0 ] ( C[66:64]                )  = '111 ;
    [ shl1 ] ( C[65:64]  &  C[43    ]  )  = '111 ;
    [ shl2 ] ( C[   64]  &  C[43:42 ]  )  = '111 ;
    [ shl3 ] (              C[43:41 ]  )  = '111 ;
```

Expression 8

The PreCalc_C function computes the common portion of the input vector C (i.e., C[63:44] in the instant example) that appears in each output specified by Expression 7. The Remainder_C function computes the remainder or rest of the input vector C that is not common to all permissible outputs. The overall detection for the All_Ones_SP function can thus be given as follows by Expression 9:

All$_{13}$ Ones_SP :=Remainder_C AND PreCalc_C;

Expression 9

Note that the PreCalc_C function can be detected or computed directly on the input vector C, with no shifting required. The Remainder_C function may also be detected or computed on the input vector C, assuming that the four shift modes or options are multiplexed and selected according to the shift component 405(3).

Figure 5:
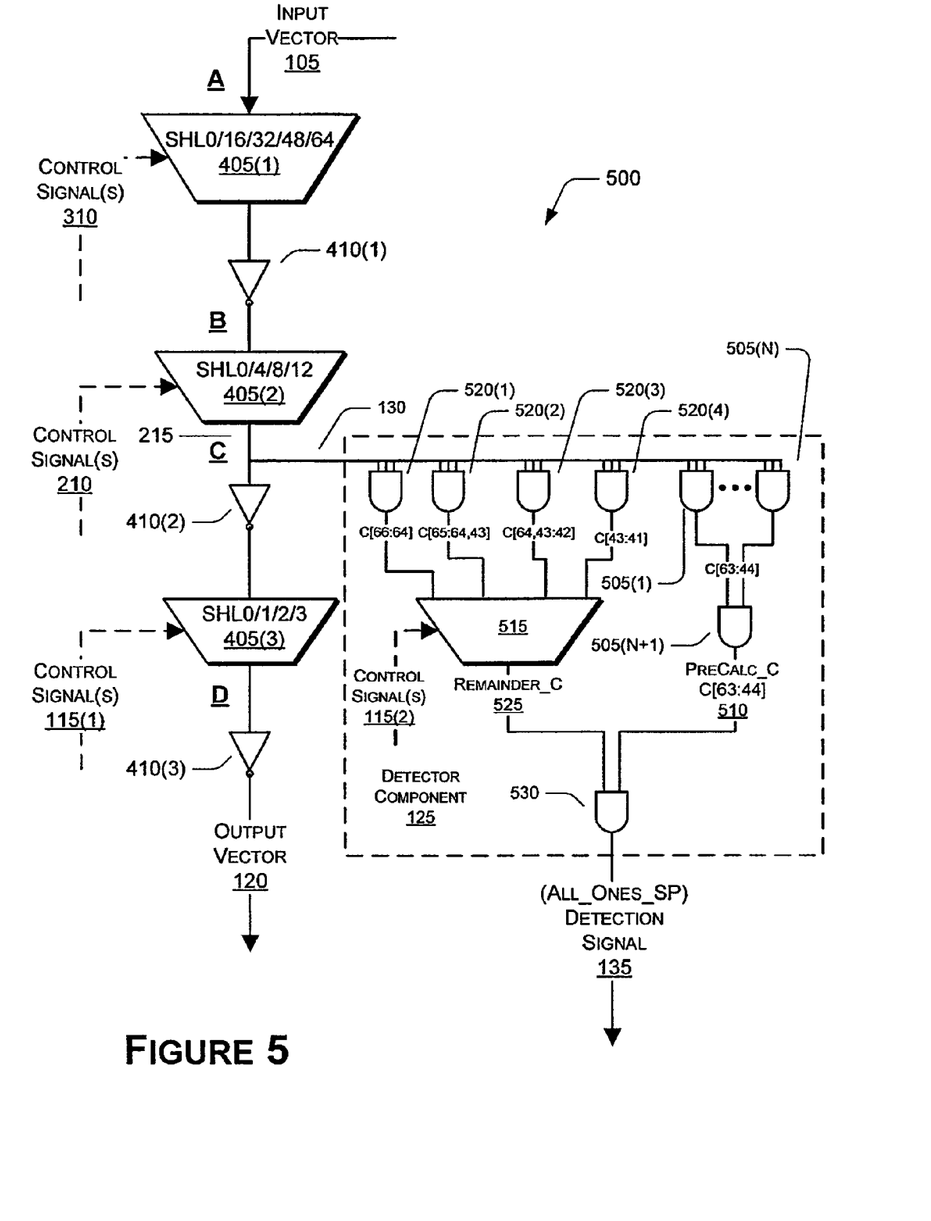
FIG. 5 is a circuit diagram that illustrates further details of the detector component as shown in FIG. 4.

FIG. 5 illustrates a circuit 500 providing an implementation of the detector component 125 as defined by the above expressions. The circuit 500 processes at least a portion 130 of the input 215 to the shift component 405(3), and processes the same in parallel with operations performed by the shift component 405(3).

Recall that in the n=66 example introduced above, the portion C[63:44] of the vector C is the common portion that would be included in all possible outputs of the shift component 405(3). Accordingly, at least this common portion may be routed to the detector component 125 for processing. A plurality of AND-gates 505(1) through 505(N+1)(collectively, AND-gates 505) receive and process signals representing the common portion C[63:44]. The AND-gates 505 realize a signal 510 representing the PreCalc_C function as described above in Expression 8 above. It is understood that the particular instance of C[63:44] applies only of the example discussed herein, and does not limit the teachings herein.

Recall also that the remainder or non-common portions of the input vector C can vary depending on the state of the shift control signal 115(1). Accordingly, a shift component 515 is configured to receive these non-shared portions of the input vector C via AND-gates 520(1)-(4) (collectively, AND-gates 520). The shift component 515 can be responsive to a control signal 115(2), which in some instances may be the same as the control signal 115(1). It is understood that the instance of the shift component 515 is provided and described for illustration only, and does not limit the teachings herein. The shift component 515 can be implemented as, for example, a multiplexer or other equivalent logic, and may further vary depending on how the logic components 110, 205, and/or 305 are implemented.

The shift component 515 and the AND-gates 520 realize a signal 525 representing the Remainder_C function as described above in Expression 8. An AND-gate 530 receives the signals 510 and 525, representing the PreCalc_C and the Remainder_C functions respectively, and ANDs them to realize the output detection signal 135. In the instant example, the detection signal 135 represents the All_Ones_SP function described above in Expression 9. Note that the detector component 125 as shown in FIG. 5 can compute the All_Ones_SP function based on at least a portion 130 of the input vector C in parallel with an illustrative shift operation performed by the shift component 405(3), rather than serially with such shift operation.

Turning to the AND-gates 505 that realize the PreCalc_C function, depending on how large the common portion of the input vector C is, the inputs to the PreCalc_C function may be too numerous to compute in parallel with a single stage of the multi-stage shifter. For example, when implementing networks of logic gates, any particular gate receives no more than three or four inputs. Such design criteria may limit the amount of fan-in to any particular gate. Gates accepting more inputs may be more expensive and may also exhibit signal propagation delays that may make them unattractive for realizing logic functions. In some instances, approximately sixteen (16) bits is the maximum that is processed in two inversion stages. Thus, there may be a trade-off between performance and cost. More particularly, restricting the amount of fan-in permitted to particular gates may increase the number of gates in the design, and may the overall cost of the hardware that realizes the design. However, this increased hardware cost may be traded-off in exchange for the faster performance and signal propagation provided by gates having lower fan-in.

Note that the PreCalc_C function can be realized independently of the Remainder_C function. Note further that, in the example being discussed herein, realizing the Remainder_C function can include detection on both high bits (i.e., C[66:64]) and low bits (i.e., C[43:41]). To reduce delays, implementations of the teachings herein can include splitting the Remainder_C function into two parts (one each for the high bits and the low bits), and using the final AND gate 530 to merge the outputs of these two parts.

As stated above, the PreCalc_C function receives as input the common or shared portion of the input vector C. In cases where the common or shared portion of the input vector C includes more than sixteen bits, the PreCalc_C function may receive more inputs than can be handled in parallel with two inversion stages by a network of gates. In some instances, the gates may have a maximum of three or four inputs. Accordingly, it may be desired to move the computation of the PreCalc_C function to one shifter-stage earlier, so that the detection can start on the vector B that is input to the shift component shift component 405(2). This can be done using a procedure similar to that described above for moving the detection on the vector D to be in parallel with the shift component 405(3), as now discussed in connection with FIG. 6.

Figure 6:
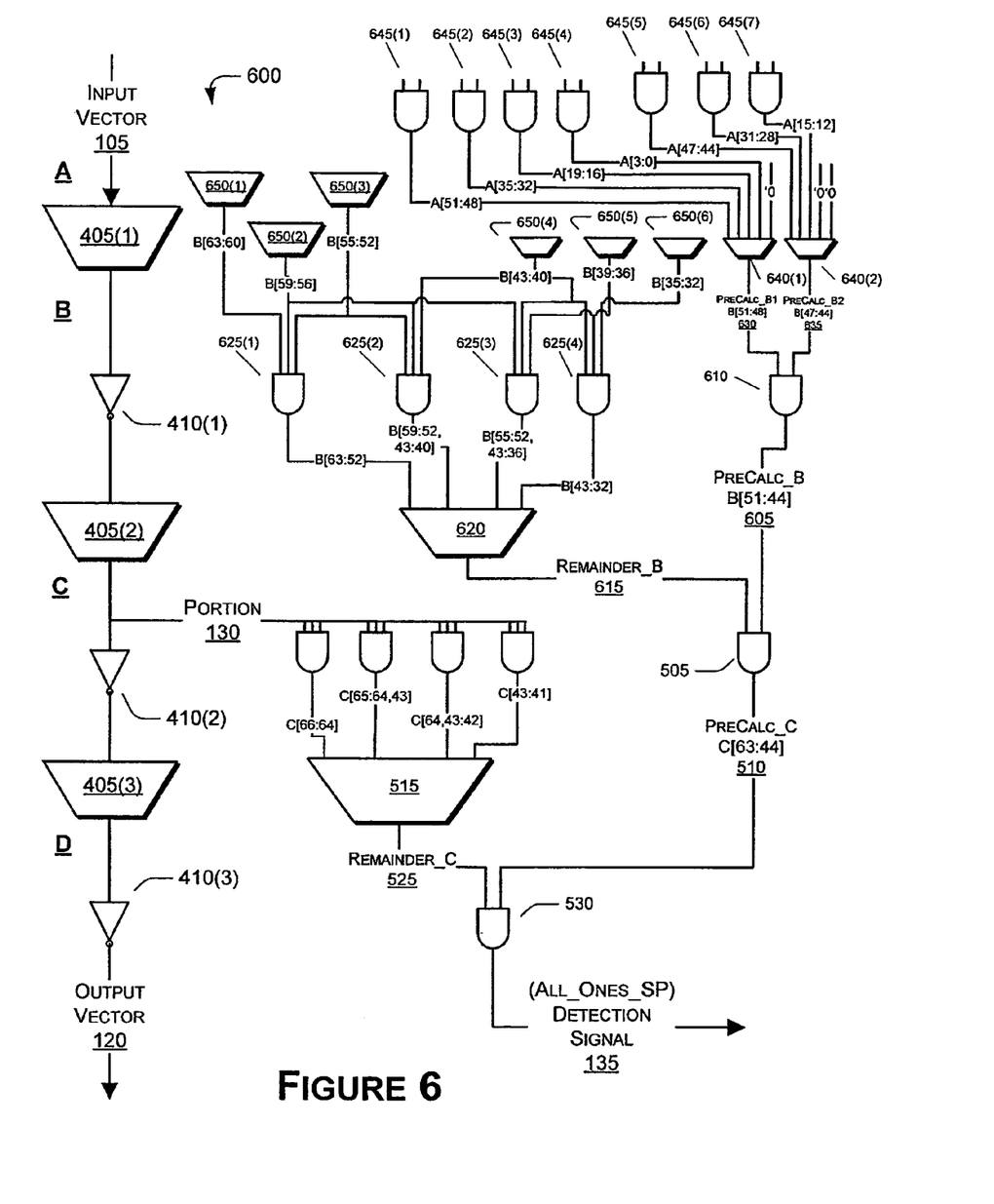
FIG. 6 is a circuit diagram that illustrates further details of the detector component, portions of which have been moved to an earlier stage, relative to the circuit shown in FIG. 5.

FIG. 6 illustrates a circuit 600 that moves portions of the detector component 125 one shifter stage earlier, relative to the circuit 500 shown in FIG. 5. More particularly, the computation of the PreCalc_C function is moved one shifter stage earlier, so that this detection is performed on the vector B. This detection is also done in parallel with operations performed by the shift component 405(2). Proceeding for convenience with the n=66 example discussed above, recall that the PreCalc_C function was specified as follows by Expression 8:

$$PreCalc\_C := (C[63:44]='1::20).$$

Recall that the general expression for the output C of the shift component 405(2) was specified in Expression 2. Substituting the variable "n" with the integer 66 in that general expression yields Expression 10 as follows:

$$\begin{aligned}
C := \text{COND} \\
[\text{shl0}\ ]\ B[66:0]\ ; \\
[\text{shl4}\ ]\ B[62:0]\ \&\ '0::4\ \ ; \\
[\text{shl8}\ ]\ B[58:0]\ \&\ '0::8\ \ ; \\
[\text{shl12}\ ]\ B[54:0]\ \&\ '0::12\ \ ; \\
\text{END}
\end{aligned}$$

Expression 10

The PreCalc_C function for this example can be written as a function of the vector B that is input to the shift component 405(2), stated by Expression 11 as follows:

$$\begin{aligned}
PreCalc\_C := \text{COND} \\
[\text{shl0}\ ]\ (B[63:44]) = '1::20\ ; \\
[\text{shl4}\ ]\ (B[59:40]) = '1::20\ ;
\end{aligned}$$

```
    [ shl8  ] ( B[55:36] ) = '1::20 ;
    [ shl12 ] ( B[51:32] ) = '1::20 ;
END
```

Expression 11

The PreCalc_C function in Expression 11 can be repartitioned into the following equivalent expression, stated by Expression 12 as follows:

```
PreCalc_C := COND
    [ shl0  ] ( B[63:52] &                     B[51:44] ) = '1::20 ;
    [ shl4  ] ( B[59:52] &  B[51:44] & B[43:40] ) = '1::20 ;
    [ shl8  ] ( B[55:52] &  B[51:44] & B[43:36] ) = '1::20 ;
    [ shl12 ] (             B[51:44] & B[43:32] ) = '1::20 ;
END
```

Expression 12

Note that the portion B[51:44] is included in each of the illustrated outputs from the PreCalc_C function as stated in Expression 12. Thus, this portion of the input vector B is common or shared by all of these possible outputs, regardless of the state of the shift control signal 210 (omitted from FIG. 6 for clarity, but shown in FIG. 5) that controls the shift component 405(2).

If the PreCalc_B and Remainder_B functions are defined as follows, the detection performed on the vector B can be split into two parts, as stated by Expression 13 below:

```
PreCalc_B := B[51:44] = '1::8 ;
Remainder_B := COND
    [ shl0  ] ( B[63:52]              ) = '1::12 ;
    [ shl4  ] ( B[59:52]   & B[43:40] ) = '1::12 ;
    [ shl8  ] ( B[55:52]   & B[43:36] ) = '1::12 ;
    [ shl12 ] (             & B[43:32] ) = '1::12 ;
END
PreCalc_C := Remainder_B AND PreCalc_B ;
```

Expression 13

Note that the PreCalc_B function processes the shared or common portion of the input vector B, while the Remainder_B function processes the remaining, non-shared portion of the input vector B. Thus, a signal 605 representing the PreCalc_B function as specified in Expression 13 can be realized at least in part by an AND-gate 610 configured to process the portion B[51:44], which is common to all possible outputs of the Pre_Calc_C function, as stated above.

A signal 615 representing the Remainder_B function, as specified in Expression 13, can be realized at least in part by a multiplexer 620 configured to output the remaining portions of the vector B in connection with AND-gates 625(1)-(4) (collectively, AND-gates 625), as indicated in FIG. 6. Finally, the signal 510 that represents the function PreCalc_C can be realized by ANDing the signals 605 and 615, which represent the PreCalc_B function and the Remainder_B function, respectively.

To calculate the PreCalc_B and/or the Remainder_B functions, it may be appropriate to apply the teachings herein once more to move the detections to operate on the vector A that is input to the first shift component 405(1). Recall the above discussion regarding the trade-off between hardware cost and design performance, regarding device fan-in and the like. In some applications, the inputs to the PreCalc_B function may be too numerous to compute in parallel with a single shifter-stage, for reasons similar to those discussed above in connection with the PreCalc_C function. Accordingly, to achieve lower fan-in for the logic gates realizing the PreCalc_B function, it may be appropriate to move some aspects of the detector component 125 one shifter-stage earlier, so that the detector component 125 operates, at least in part, on the input vector A. FIG. 6 also illustrates an implementation of this aspect of the teachings herein, as now discussed.

Continuing with the n=66 example discussed above, recall the general expression of the vector B as a function of the input vector A, as specified in Expression 1:

```
B := COND
    [ shl0  ] A[n:0] ;
    [ shl16 ] A[(n-16):0] & '0::16 ;
    [ shl32 ] A[(n-32):0] & '0::32 ;
    [ shl48 ] A[(n-48):0] & '0::48 ;
    [ shl64 ] A[(n-64):0] & '0::64 ;
END
```

Expression 1 is expanded, with the variable "n" substituted with the integer 66, resulting in Expression 14, as follows:

```
B := COND
    [ shl0  ] A[66:0];
    [ shl16 ] A[50:0] & '0::16 ;
    [ shl32 ] A[34:0] & '0::32 ;
    [ shl48 ] A[18:0] & '0::48 ;
    [ shl64 ] A[2:0]  & '0::64 ;
END
```

Expression 14

Recall that the portion B[15:44] of the vector B is shared across all possible forms of the output vector B, as output by the first shift component 405(1). Recall further that the function PreCalc_B was defined above as follows:

PreCalc_B := B[51:44]='1::8;

For convenience, the function PreCalc_B can be split into two parts, as follows in Expression 15:

```
PreCalc_B1 := (B[51:48] = '1 :: 4) ;
PreCalc_B2 := (B[47:44] = '1 :: 4) ;
```

Expression 15

The function PreCalc_B thus can be realized by ANDing the outputs of these two parts, as follows in Expression 16:

PreCalc_B := PreCalc_B1 AND PreCalc_B2;

Expression 16

In FIG. 6, the signals 630 and 635 represent the PreCalc_B1 and PreCalc_B2 functions, respectively, and the AND-gate 610 realizes the PreCalc_B function based on these two signals as input, producing the signal 605.

Now, the two parts of the PreCalc_B function (PreCalc_B1 and PreCalc_B2) can be rewritten as functions of the vector A, which effectively moves the computation of the Pre-Calc_B function one shifter stage earlier. Thus, the detection now operates on the input vector A in parallel with the first shift component 405(1). Rewriting the PreCalc_B1 and

```
PreCalc_B1 := COND
        [ shl0  ] A[51:48] = '1::4 ;
        [ shl16 ] A[35:32] = '1::4 ;
        [ shl32 ] A[19:16] = '1::4 ;
        [ shl48 ] A[ 3:0 ] = '1::4 ;
        [ shl64 ] '0 ;
        END
PreCalc_B2 := COND
        [ shl0  ] A[47:44] = '1::4 ;
        [ shl16 ] A[31:28] = '1::4 ;
        [ shl32 ] A[15:12] = '1::4 ;
        [ shl48 ] '0 ;
        [ shl64 ] '0 ;
        END
```

Expression 17

In FIG. 6, the shift components 640(1) and 640(2)(collectively, the shift components 640) realize the PreCalc_B1 and the PreCalc_B2 functions, respectively. As shown in FIG. 6, the shift components 640 receive the inputs from the vector A that are indicated above by Expression 17, using the AND-gates 645(1)-(7)(collectively, AND-gates 645).

Similarly, the signal 615 realizing the Remainder_B function can be computed using the shift components 650(1)-(6) (collectively, the shift components 650), as shown in FIG. 6. It is noted that the detection is done using only one inversion stage more than the number of stages in the shifter.

It is understood that all components computing or providing the inputs to the AND-gate 505 that realizes the Pre-Calc_C signal 510 may be considered part of the detector component 320 shown in FIG. 3. This relationship is not shown in FIG. 6 for clarity and legibility, but is nevertheless understood.

Figure 7:
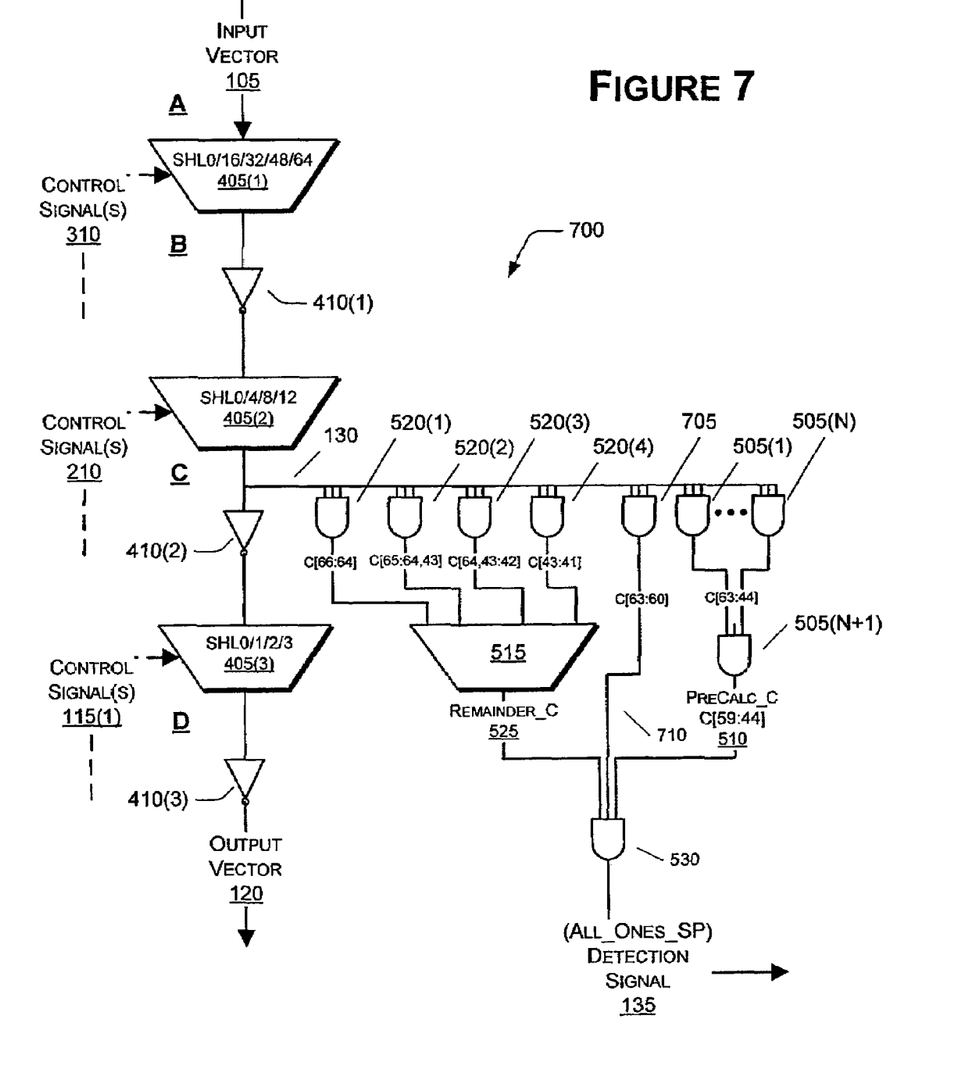
FIG. 7 is a circuit diagram that illustrates an alternative embodiment of the circuit shown in FIG. 5.

FIG. 7 illustrates a circuit 700 that builds upon the circuit shown in FIG. 5. In light of the trade-offs mentioned herein, some implementations of the instant teachings may not move the detector component to shifter-stages earlier than the stage that outputs the vector C, as illustrated in FIG. 5. As shown in FIG. 7, it is possible to use a formerly unused input to the AND-gate 530 to "AND" the excess bits (i.e., those beyond 16 bits) that are used to compute the signal 510 that represents the PreCalc_C function, and that are processed by the AND-gates 505. Recall that the AND gate 530 ANDs the signals 510 and 525, which represent the PreCalc_C and Remainder_C functions, respectively. Continuing the n=66 example discussed herein, the AND-gate 705 ANDs C[63:60], and passes the output 710 to an unused input of the AND-gate 530.

Returning briefly to FIG. 3, the detector components 125 and/or 320 that are implemented as taught herein to operate in parallel with corresponding logic components 110, 205, and 305 can be at least two inversion stages faster than detector components 125 and/or 320 that begin only after the last logic component (i.e., logic component 110 shown in FIG. 3) has produced output. This difference grows with the number of bits being passed to the detector components 125 and/or 320. For different sizes of detected patterns or sequences, as well as different structures of the logic components 110, 205, and 305, it may be possible to optimize differently. More particularly, when larger patterns are being detected, the inputs to the "PreCalc" functions can become larger. Accordingly, it may become increasingly beneficial to move the detection to earlier stages of the logic. In the n=66 example discussed herein, when performing detections in the context of double precision (DP) floating-point operations, which involve 53-bit representations, it may be beneficial to move at least some aspects of the detector components 125 and/or 320 all the way back to the vector A.

Figure 8:
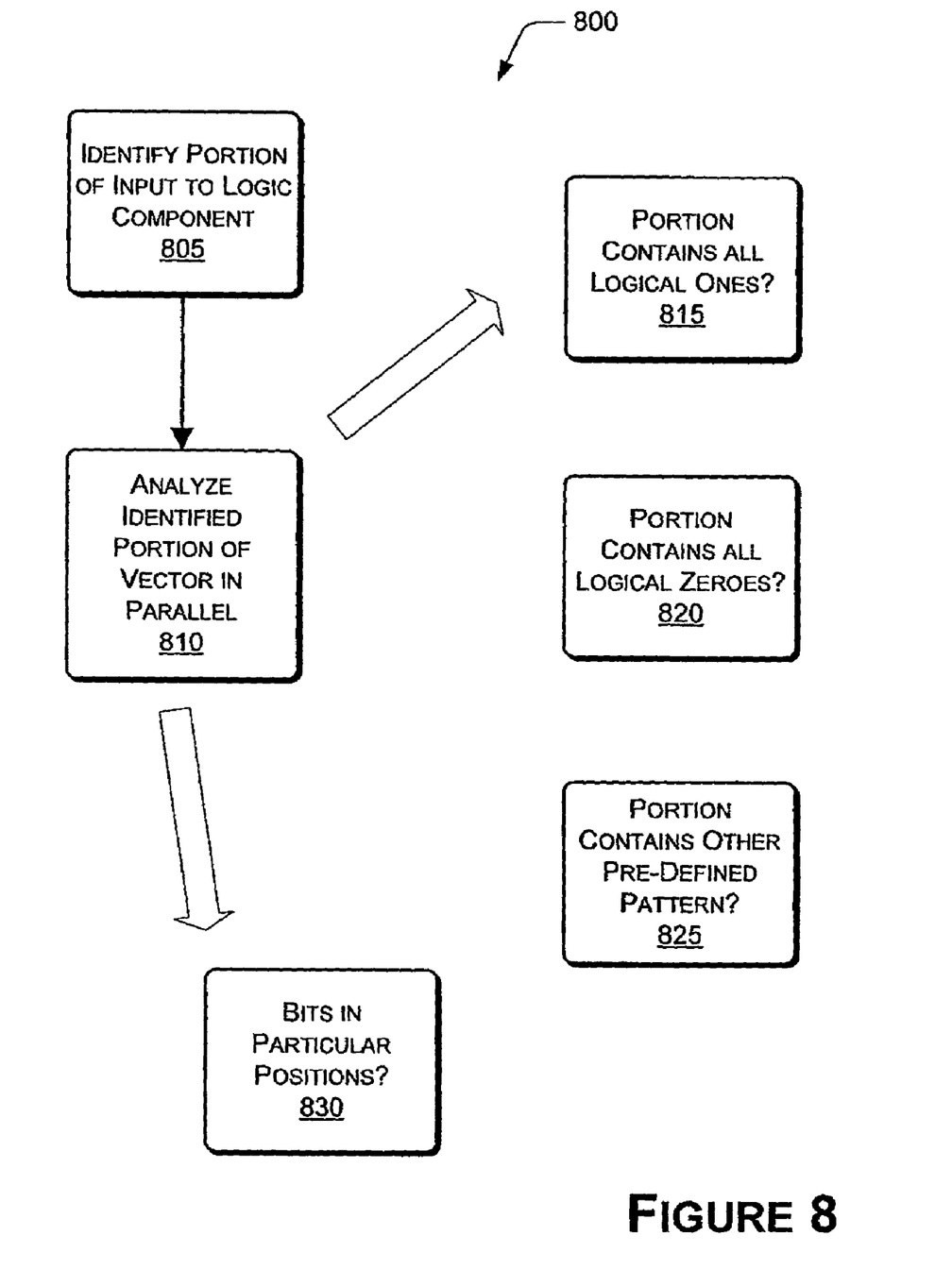
FIG. 8 is a flowchart illustrating a process flow that can be performed by the architectures, components, and/or circuits disclosed herein to perform detection operations in parallel with one or more logic components.

FIG. 8 illustrates a process flow 800 that can be performed by the architectures, components, and/or circuits disclosed herein to perform detection operations in parallel with one or more logic components, or by architectures, components, and/or circuits other than disclosed herein. Also, the process 800, and all other processes, functions, or techniques described herein, may be performed by software, including but not limited to software that simulates or models any aspect of the architectures, components, and/or circuits described elsewhere herein.

In block 805, at least a portion 130 of a vector 105 that is provided as input to a logic component 110 is identified. As discussed elsewhere herein, the logic component 110 can include components that perform shifting, multiplexing, and other logical functions. This logic component 110 can be operable in a variety of modes in response to a control signal 115. With these types of logic component 110, the portion 130 identified for parallel processing may include a common portion that appears in the output of the logic component 110 regardless of the setting or state of the applicable control signals 115. In such cases, at least this common portion of the input vector 105 can be processed independently of and in parallel with the operations performed by the logic component 110.

In block 810, the portion 130 of the input vector 105 identified in block 805 is analyzed in parallel with whatever operations are performed by the logic component 110. This analysis can include detecting at least one particular string or sequence of bits in the portion 130 of the input vector 105. For example, a sequence of one-bits can be detected (block 815), a sequence of zero-bits can be detected (block 820), predefined patterns of bits can be detected (block 825), or bits can be detected in particular positions (block 830). The bit detections can be performed for any purpose related to bitwise or logical processing, including but not limited to floating point operations that test for overflow conditions, sticky-bits, or the like.

Figure 9:
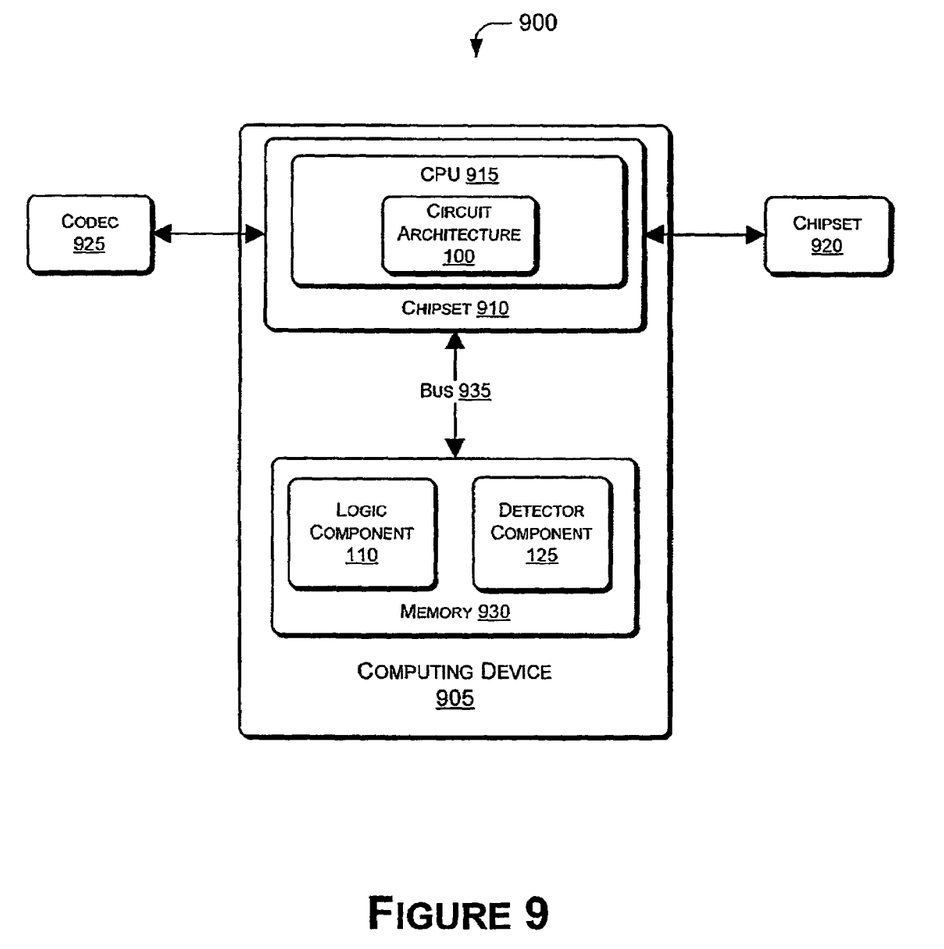
FIG. 9 illustrates an overall computing environment relating software or computer-readable media that may implement the teachings herein.

FIG. 9 illustrates an overall computing environment 900 for implementing the teachings herein as they may relate to software or computer-readable media as disclosed herein. A computing device 905 can include a chipset 910 containing at least a CPU 915, which may incorporate the circuit architecture 100. Alternatively, the circuit architecture 100 and CPU 910 may be adapted to communicate operatively with an external chipset 920. One or more of the chipsets 910 or 920 may be coupled to communicate with one or more software- or hardware-based entities, and example of which is at least one coder-decoder (codec) 925. The codec 925 may be adapted to process audio or video data, for example, and may provide the input vector 105 and also may receive the output vector 120 and/or the detection signal 135.

In some embodiments of the subject matter described herein, at least the logic component 110 and the detector component 125 described herein may be implemented as software, in contexts including but not limited to software emulations or simulations of circuits, or in realizations of the teachings herein as microcode or firmware. Software, such as computer-aided design (CAD) packages, may also model, emulate, or simulate at least the logic component 110 and the detector component 125 as described herein to facilitate design, testing, and analysis. In such embodiments, at least software-based implementations of the logic component 110 and the detector component 125 may reside in a memory 930, which may communicate with the chipset 910 via a bus 935. It is understood that the layout of the bus 935 is shown in FIG. 9 for convenience and clarity of illustration. The bus 935 may be of any data width or any bandwidth as chosen by those skilled in the art for a given implementation. The memory 930 can be implemented to have one or more read-only memory (ROM) portions, one or more random-access memory (RAM) portions, and/or one or more flash-memory portions.

It is understood that computer-readable media suitable for storing software executing the processes taught herein can include at least the memory 930. It is further understood that signals representing the software-based implementations of the logic component 110 and the detector component 125 may be propagated via the bus 935.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. Apparatus comprising:
a processor communicatively coupled with a coder-decoder (codec) adapted to process data, wherein the processor comprises:
a logic component configured to perform at least one logical operation on an input vector, wherein the logic component is operable in a plurality of selectable operating modes; and
a detector configured to receive as input at least a portion of the input vector and to perform at least one detection on the portion of the input vector in parallel with the logical operation, wherein the detector comprises a multiplexer to receive a remainder of the input vector, and wherein the portion of the input vector is a common potion of the input vector to be output by the logic component when operating in selectable operating modes.

2. The apparatus of claim 1, wherein the logic component is a shift component.

3. The apparatus of claim 2, wherein the logic component is a multiplexer operable in a plurality of modes to effect bitwise logic operations corresponding to the modes.

4. The apparatus of claim 1, wherein the detector is configured to determine whether bits in the portion of the input vector are set to a logical-one value.

5. The apparatus of claim 1, wherein the detector is configured to determine whether bits in the portion of the input vector are set to a given pre-defined value.

6. The apparatus of claim 1, further comprising at least a further logic component configured to perform a further logic operation on the input vector, and wherein the detector includes:
at least a first component that is configured to perform a first detection on the portion of the input vector in parallel with the logic operation; and
at least a further component that is configured to perform at least a further detection on a further portion of the input vector in parallel with the further logic operation.

7. The apparatus of claim 1, further comprising software adapted to simulate the logic component.

8. The apparatus of claim 1, further comprising software adapted to simulate the detector.

9. A computer-implemented method for communicating data between a processor and a coder-decoder (codec) comprising:
storing, in a memory, instructions for performing the method for communicating data between a processor and a coder-decoder (codec), wherein the processor is communicatively coupled to the coder-decoder (codec);
executing the instructions on a processor;
according to the instructions being executed:
identifying a portion of a vector input to a logic component, wherein the portion of the vector appears in an output of the logic component; and
analyzing the portion of the vector in parallel with a logic operation performed by the logic component, wherein said analyzing the portion of the vector comprises determining whether bits in the portion of the vector are set to a logical-one value.

10. The method of claim 9, wherein the logic component is operable in a plurality of selectable operating modes.

11. The method of claim 9, wherein said identifying a portion of a vector comprises identifying a portion of the vector that appears in outputs of the logic component.

12. The method of claim 9, wherein said identifying a portion of the vector comprises identifying a portion of a vector that is input to a multiplexer that is configured to perform a bitwise logic operation.

13. The method of claim 9, further comprising identifying at least a further portion of at least a further vector that is input to at least a further logic component having a plurality of selectable operating modes, wherein the further portion is included in an output of the further logic component when operating in at least one of the selectable operating modes.

14. The method of claim 9, wherein said analyzing the portion of the vector comprises determining whether bits in the portion of the vector are set to a given pre-defined value.

15. Apparatus comprising:
a processor communicatively coupled with a coder-decoder (codec) adapted to process data, wherein the processor comprises:
a logic component configured to perform at least one logical operation on an input vector;
a detector configured to receive as in put at least a portion of the in put vector and to perform at least one detection on the portion of the input vector in parallel with the logical operation, wherein the detector comprises a multiplexer to receive a remainder of the input vector; and a further logic component configured to perform a further logic operation on the input vector, and wherein the detector includes:
  at least a first component that is configured to perform a first detection on the portion of the input vector in parallel with the logic operation; and
  at least a further component that is configured to perform at least a further detection on a further portion of the input vector in parallel with the further logic operation.

* * * * *